United States Patent Office 3,157,677
Patented Nov. 17, 1964

3,157,677
SULFONIC ACID SALTS OF AURAMINE
Walter Seibert, Fritz Schubert, and Hans Otterbach, all of Ludwigshafen (Rhine), Germany, assignors to Badische Anilin- & Soda-Fabrik Aktiengesellschaft, Ludwigshafen (Rhine), Germany
No Drawing. Filed Apr. 29, 1960, Ser. No. 25,515
Claims priority, application Germany May 9, 1959
2 Claims. (Cl. 260—396)

This invention relates to dyestuffs of the auramine series having good solubility in alcohols and in mixtures of alcohols with water, and to a process for their production.

It is known to prepare dyestuffs of the auramine series which dissolve well in alcohols by reaction of water-soluble salts of auramine dyestuffs with water-soluble salts of nitric or nitrous acid. The solubility of these dyestuffs in mixtures of alcohol and water, however, decreases strongly as the water content of these mixtures increases. For various industrial purposes, as for example for use in offset printing, it is however desirable to have available dyestuffs which will also dissolve in mixtures of alcohol and water with a considerable water content.

It is an object of the present invention to provide new dyestuffs of the auramine series which have excellent solubility in alcohols as well as in mixtures of alcohols with water.

Another object of the invention is to provide a process for the production of dyestuffs of the said kind.

We have found that these objects are achieved by treating a dyestuff salt containing a cation of the auramine series and an anion of the inorganic acid, in water or an aliphatic alcohol with 1 to 6 carbon atoms, with an alkali metal or ammonium salt of an alkyl- or aryl-sulfonic acid. Alkyl- or aryl-sulfonic acids used in the practice of our invention include methane-sulfonic acid, ethane-sulfonic acid, benzene-sulfonic acids, hexane-sulfonic acid, toluene-sulfonic acids and xylene-sulfonic acids. The said sulfonic acids are used in the form of their alkali metal salts or their ammonium salts. As alkali metal salts, the sodium and potassium salts are preferred because of their ready accessibility.

The useful inorganic sulfonic acid salts have the general formula: R—SO$_3$M where R is a radical selected from the group consisting of an alkyl radical having one to six carbon atoms, a phenyl radical, a tolyl radical and a xylyl radical and M is an ion selected from the class consisting of sodium, potassium and ammonium ions.

As dyestuff salts which contain cations of the auramine series and anions of inorganic acids there are suitable for the new process for example Auramine O (C.I. 41000 Basic Yellow 2) and Auramine G (C.I. 41005 Basic Yellow 3) and the dyestuffs obtainable by the process according to the copending application Serial No. 708,770, filed January 14, 1958, now U.S. Patent No. 3,009,924. The said dyestuffs of the auramine series contain chloride ions or nitrate ions as anions.

In the form of its hydrochloride salt Auramine O has the structural formula:

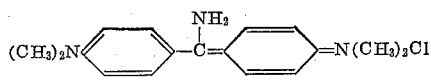

and Auramine G, in the form of its hydrochloride salt, has the structural formula:

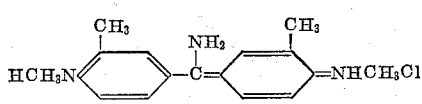

The relative proportions of the initial materials are preferably chosen so that one equivalent of the alkali alkyl- or aryl-sulfonate is used for each mol of the dyestuff salt. However, dyestuffs having excellent solubility properties are obtained even with much smaller amounts of the sulfonates, as for example 0.8 to 0.9 equivalent of sulfonate to 1 mol of the auramine dyestuff salt used.

As alcohols there are suitable aliphatic alcohols with 1 to 6 carbon atoms, as for example methanol, ethanol, propanol, isopropanol, glycol and glycol monomethyl ether.

The reaction can be carried out at room temperature or at elevated temperature, preferably up to about 80° C. It is preferable to work in the most concentrated solution or dispersion possible, for example in ten to twenty times the amount of water or of the said aliphatic alcohols with reference to the weight of the auramine dyestuff used. The aqueous solution obtained in the commercial manufacture by the redissolution of the crude auramine dyestuff, or the moist pressed cake obtained therefrom by salting out and filtration, may also be used as initial material.

It is surprising that the dyestuffs of the new process will dissolve not only in pure alcohols, such as methanol, ethanol, propanol, glycols and glycol monoalkyl ethers and in their mixtures with small amounts of water, but that they have an excellent solubility even at room temperature in alcohol-water mixtures with high water contents. Their solubility even increases up to a maximum with increasing water content of the alcohol-water mixtures. It is true that if the water content of the alcohol-water mixtures is still further increased, the solubility of the dyestuffs falls off again, but even so remains higher than is the case with the auramine dyestuffs hitherto usual.

In the treatment of the auramine salts with the said sulfonates, a double reaction takes place in which the anions of the inorganic acids are wholly or partly exchanged by the alkyl- or aryl-sulfonate ions. If one of the above-mentioned alcohols is used as the reaction medium, the alkyl- or aryl-sulfonates of the auramine dyestuffs remain dissolved in the reaction medium after the reaction, while the alkali metal salts of the inorganic acids formed at the same time are substantially insoluble in the reaction medium and can be separated for example by filtration. If water is chosen as the reaction medium, the auramine dyestuff salts formed are substantially insoluble therein while the alkali metal salts of the inorganic acids remain dissolved in the mother liquor.

It was not to be expected that the alkyl- or aryl-sulfonates of the auramines could be prepared thus, because it is not possible to obtain the auramine acetates in the same way.

The new auramine dyestuffs are substantially free from inorganic impurities, especially when anhydrous alcohols are used as solvents. The initial dyestuffs may therefore also be used in impure form without impairing the excellent properties of the dyestuffs obtained.

The following examples will further illustrate this invention but the invention is not restricted to these examples. The parts are by weight and, unless otherwise stated, the percentages are by weight.

EXAMPLE 1

152 parts of Auramine O are heated to boiling while stirring for an hour with 80 parts of finely ground sodium benzene sulfonate and 1,200 parts of ethanol (99 to 100% strength). Then the mixture is allowed to cool to 35° C., filtered under reduced pressure and the residue washed with 150 to 200 parts of ethanol. By distilling off the solvent from the filtrate there are obtained 192 parts of an auramine dyestuff practically free from sodium chloride which dissolves very well in dilute alcohol.

The solubility of the dyestuff in ethanol and mixtures of ethanol and water at 20° C. may be seen from the following table:

| Water content of the mixture, percent by volume | Amount of dissolved dyestuff, grams/liter |
| --- | --- |
| 0 | 90 |
| 5 | 220 |
| 10 | 330 |
| 20 | 420 |
| 50 | 180 |

EXAMPLE 2

125 parts of Auramine O together with 80 parts of ground sodium benzene sulfonate and 1,200 parts of n-propanol are heated to boiling for 1 hour while stirring. The mixture is allowed to cool to 30° C., filtered under reduced pressure and the residue washed with 200 parts of n-propanol. In the way described in Example 1 there are recovered from the filtrate 192 parts of the auramine dyestuff, the properties of which are very similar to those of the dyestuff obtained according to Example 1.

A similar result is obtained when using methanol as the reaction medium.

EXAMPLE 3

A mixture of 152 parts of Auramine O, 80 parts of ground sodium benzene sulfonate and 3,100 parts of isopropanol is stirred for an hour at the boiling temperature. The mixture is worked up as in Example 2 and 195 parts of a dyestuff with a very low sodium chloride content are obtained which dissolves well in dilute alcohol.

Instead of isopropanol, normal hexanol may also be used with a good result; the reaction temperature is then chosen at 80° C.

EXAMPLE 4

152 parts of Auramine O are dissolved together with 70 parts of ground potassium benzene sulfonate in 1,200 parts of ethanol and the mixture heated to boiling for 1 hour while stirring. After working up as in Example 1 there are obtained 196 parts of an auramine dyestuff with very good solubility in dilute alcohols.

A similar dyestuff is obtained by using 80 parts of potassium 3,5-dimethylbenzene sulfonate instead of the potassium benzene sulfonate.

EXAMPLE 5

A solution of 152 parts of Auramine O and 107 parts of sodium 4-methylbenzene sulfonate in 1,200 parts of ethanol is heated to boiling for 1 hour while stirring and worked up as in Example 1. 198 parts of an auramine dyestuff practically free from sodium chloride are obtained which has very good solubility in dilute alcohol.

EXAMPLE 6

A mixture of 31.5 parts of Auramine O, 11.8 parts of ground sodium methylsulfonate and 300 parts of n-butanol is heated to boiling for 1 hour while stirring, the mixture filtered after cooling, and the residue washed with a little butanol. The butanol is removed from the filtrate by distillation under reduced pressure. 34 parts of a dyestuff are obtained which has good solubility in ethanol and mixtures of ethanol and water.

Instead of n-butanol there may be used with equally good results also isobutanol, n-propanol or isopropanol.

If 31.5 parts of Auramine O are reacted in the same way with 34.5 parts of the sodium salt of 9-hydroxyoctadecane-10-sulfonic acid, the same amount of octadecane sulfonic acid or 20.5 parts of hexane sulfonic acid, a yellow pasty dyestuff is obtained which dissolves well in ethanol and mixtures of ethanol and water.

EXAMPLE 7

63 parts of Auramine O having a sodium chloride content of 2.3% are dissolved in 3500 parts of water at 75° C. Into this solution, at about 70° C., there is allowed to flow a solution of 36 parts of sodium benzene sulfonate in 200 parts of water. The mixture is allowed to cool slowly, the deposited precipitate thereby solidifying at about 40° C. The mixture is stirred for another 12 hours, the reaction product filtered off and dried. 70 parts of a dyestuff are obtained which is of good solubility in alcohols and mixtures of alcohols and water.

The manner of operation just described may also be modified by allowing the solution of the sodium benzene sulfonate to flow into the Auramine solution cooled to 40° C. The mixture is stirred with slow cooling for about another 14 hours. The precipitate solidifies at about 30° C. It is filtered off and dried. The yield is 69 parts of dyestuff. The mother liquor contains practically no auramine.

Another modification of the manner of operation consists in taking up the separated dyestuff in a water-insoluble solvent, as for example chlorofrom, and recovering the dyestuff from the separated solvent phase by evaporation of the solvent.

EXAMPLE 8

63 parts of Auramine O with a sodium chloride content of 2.6% are suspended in 2,000 parts of water and a solution of 36 parts of sodium benzene sulfonate in 300 parts of water is allowed to flow therein within two hours. The mixture is stirred for another five hours, the deposited dyestuff is filtered off and dried at moderately elevated temperature. The dyestuff obtained in a yield of 75 parts dissolves smoothly in ethanol and 50% aqueous ethanol.

A dyestuff with almost the same properties is obtained by reducing the amount of the sodium benzene sulfonate by 6 to 10% or by using the same amount of ammonium benzene sulfonate instead of sodium benzene sulfonate.

EXAMPLE 9

A suspension is prepared from 20,000 parts of water and 1539 parts of a moist pressed cake of Auramine O with a water content of 21.2%. At room temperature there is added while stirring a solution of 788 parts of sodium benzene sulfonate in 3,000 parts of water during two hours. The mixture is stirred for another 10 hours, the dyestuff filtered off and dried. 1,486 parts of a dyestuff are obtained which is of good solubility in alcohols and mixtures of alcohols and water. The mother liquor no longer contains any auramine.

A dyestuff of about the same properties can be obtained when the amount of sodium benzene sulfonate used is reduced by 10 to 20%.

EXAMPLE 10

A solution of 39 parts of sodium-4-methylbenzene sulfonate in 200 parts by volume of water is added at room temperature during the course of 90 minutes to a dispersion of 63 parts of Auramine O with a sodium chloride content of 2.9% in 2,000 parts by volume of water. The mixture is stirred for 12 hours, the dyestuff filtered off and dried at moderate temperature. 77 parts of a dyestuff are obtained which dissolves well in alcohol and mixtures of alcohol and water.

A dyestuff with very similar properties is obtained in a yield of 77 parts when a solution of 42 parts of sodium-2,4-dimethylbenzene sulfonate in 200 parts by volume of water is added to the above-mentioned Auramine O dispersion and the mixture is worked up as described above.

We claim:

1. The compound of the formula

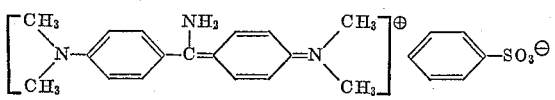

2. The compound of the formula

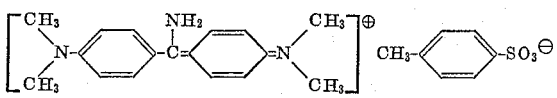

References Cited in the file of this patent

UNITED STATES PATENTS

| | | |
|---|---|---|
| 1,841,876 | Buc | Jan. 19, 1932 |
| 2,070,275 | Holzoch et al. | Feb. 9, 1937 |
| 2,196,885 | Wyler | Apr. 9, 1940 |
| 2,948,753 | Krang | Aug. 9, 1960 |
| 3,009,924 | Schubert et al. | Nov. 21, 1961 |

FOREIGN PATENTS

| | | |
|---|---|---|
| 815,966 | Great Britain | July 1, 1959 |

OTHER REFERENCES

Pratt: The Chemistry and Physics of Organic Pigments, 1947, pages 135–139, 152 relied upon.

McCutcheon: Synthetic Detergents, 1950, pages 123, 124 relied upon.

Fuson et al.: The Systematic Identification of Organic Compounds, 4th Edition, 1956, pp. 69, 70, 79.